United States Patent [19]

Aranguren et al.

[11] Patent Number: 4,674,085
[45] Date of Patent: Jun. 16, 1987

[54] LOCAL AREA NETWORK

[75] Inventors: William L. Aranguren, Wayside; Mario A. Restrepo, Ocean; Michael J. Sidey, Middletown, all of N.J.

[73] Assignees: American Telephone and Telegraph Co.; AT&T Information Systems Inc., both of Murray Hill, N.J.

[21] Appl. No.: 815,959

[22] Filed: Oct. 6, 1986

Related U.S. Application Data

[63] Continuation of Ser. No. 714,683, Mar. 21, 1985, abandoned.

[51] Int. Cl.$^4$ ............................................. H04J 3/02
[52] U.S. Cl. ................................................... 370/85
[58] Field of Search ..................... 370/60, 94, 85, 86, 370/15; 340/825.5, 825.05

[56] References Cited

U.S. PATENT DOCUMENTS

| | | | |
|---|---|---|---|
| 3,856,993 | 12/1974 | Closs et al. | 370/85 |
| 4,347,498 | 8/1982 | Lee et al. | 340/825.02 |
| 4,551,721 | 11/1985 | Kozlik | 370/85 |

FOREIGN PATENT DOCUMENTS 54-114103  6/1979  Japan ..................................... 370/85

OTHER PUBLICATIONS

"A New Local Area Network Architecture Using a Centralized Bus" A. S. Acampora and M. G. Hluchyj, IEEE Communications Magazine, vol. 22, No. 8, Aug. 1984, pp. 12-21.

Primary Examiner—Douglas W. Olms
Assistant Examiner—Frank M. Scutch, III
Attorney, Agent, or Firm—Gregory C. Ranieri

[57] ABSTRACT

A modular, hierarchical local area network is realizable by using existing twisted pair wiring, for example, in a building together with several elements known as network access units and hub units. A network access unit is connected to a device (microprocessor, display terminal, peripheral device, other local area network, information systems network or the like) in the local area network to give that device access to and from the network. The network access device is designed for simple daisy chaining with other devices to form a node when devices are colocated in the same section or room in the building. The hub unit is the network building block which permits extensive expansion of the local area network. It provides a connection point for access units or other hub units, performs collision detection operations, if necessary, and serves as a loop-back point for the network. Switchably connectable termination impedances and loop-backs are automatically passed to the appropriate points in the local area network. While most small local area networks are considered for intra-building applications, the present network is applicable to inter-building applications, also.

22 Claims, 6 Drawing Figures

LOCAL AREA NETWORK

This application is a continuation of application Ser. No. 714,683, filed Mar. 21, 1985, now abandoned.

TECHNICAL FIELD

This invention relates to the field of communication systems and, more particularly, to shared resource arrangements such as local area networks.

BACKGROUND OF THE INVENTION

A local area network is a high speed, multiple access, private communication network. Depending upon the communication medium, for example, cable, wire or optical fiber, the local area network has the capability both to handle data at rates exceeding 10 M bps and to connect more than 50,000 devices.

Local area networks are currently experiencing widespread acceptance as a means for providing interconnection and communications among host computers, terminals and peripheral equipment located throughout a single building or group of buildings. These local area networks have emerged from a variety of different architectures based on the point-to-point, star, ring, bus and tree topologies.

Point-to-point topology causes each device in the network to be connected to every other device. As such, point-to-point topology is limited to small networks because of high associated costs of implementation and difficulty in monitoring network activity due to the lack of a central communications control device.

Star topology is popular because it affords centralized control of the network from a single switching node to which all devices in the local area network are connected. In this topology, device connections are simple and can often be accomplished using existing wire.

Ring topology is one in which each device is connected to exactly two other devices in the local area network. A message token is passed to each device in sequence around the ring in order to permit each device an opportunity to send or receive information. While this topology reduces considerably the number of device connections over the point-to-point and star topologies, it does not offer centralized communications control. Moreover, when a device in the network experiences a failure, the entire local area network may be disabled until the failed device is removed or replaced.

Bus topology is characterized by the plurality of devices in the network being connected individually to a single, bidirectional, broadband communications medium referred to as a bus. Generally, each device has a unique address and can gain bus access by a centralized or distributed interrupt priority scheme. Message collisions are avoided through the use of specific protocols. Tree topology resembles several bus networks linked together via a common bus. This topology is applicable to networks which must operate over long distances.

As stated above, several different media can be used to carry local area network communications. Considerations regarding network topology, maximum distance between nodes, volume of information to be transmitted, and speed of transmission are critical in selecting a particular communications medium. Physical limitations such as plenum, conduit sizes, and routing plans in the building also affect the choice of the medium. Finally, for some network topologies, user accessibility to the bus for passive tapping is extremely important.

Commercially available local area networks such as Ethernet (Ethernet is a trademark of Xerox Corporation) make use of the various topologies and transmission media described above. At the present time, coaxial cable appears to be the medium of choice because it is capable of supporting very high bit rates. However, local area networks relying on a coaxial cable transmission medium require the use of complex repeaters and regenerators to maintain signal integrity and to obtain reasonable transmission distances for the network. Coaxial cable is also quite expensive and bulky which presents problems when wiring a local area network in an existing building. Also, since many present local area networks involve some type of bus structure and because the bus structure is physically long, there are many signal timing and synchronization problems caused by dispersive and reflective effects of the transmission medium which must be overcome by the collision detection circuitry and bus coupler or tap spacing, at the very least. Finally, many of the present local area networks lack modularity and modular interconnectivity.

SUMMARY OF THE INVENTION

Overcoming these and other problems and in accordance with the principles of the present invention, a modular, hierarchical local area network is realizable by using existing twisted pair wiring, for example, in a building together with several elements known as network access units and hub units. A network access unit is connected to a device (microprocessor, display terminal, peripheral device, other local area network, information systems network or the like) in the local area network to give that device access to and from the network. The network access device is designed for simple daisy chaining with other devices to form a node when devices are colocated in the same section or room in the building. The hub unit is the network building block which permits extensive expansion of the local area network. It provides a connection point for access units or other hub units, performs collision detection operations, if necessary, and serves as a loop-back point for the network. Switchably connectable termination impedances and loop-backs are automatically passed to the appropriate points in the local area network.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
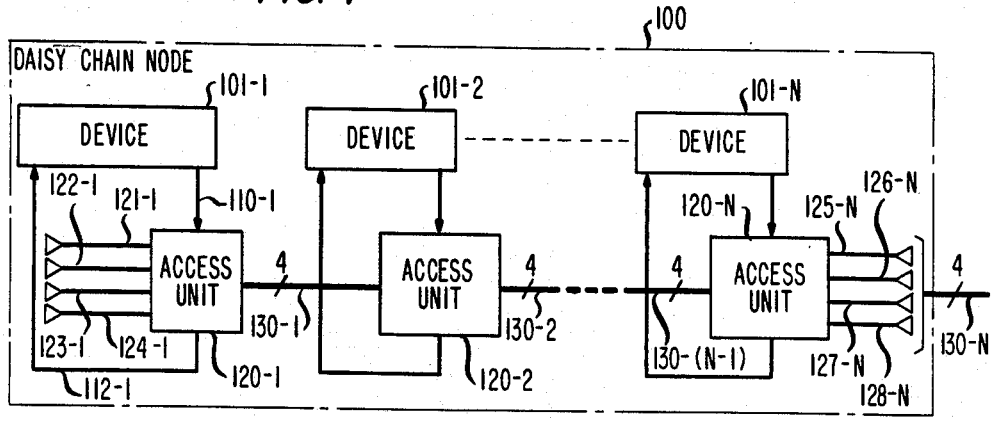
FIG. 1 is a simplified block diagram of a daisy chain node configuration.
Figure 2:
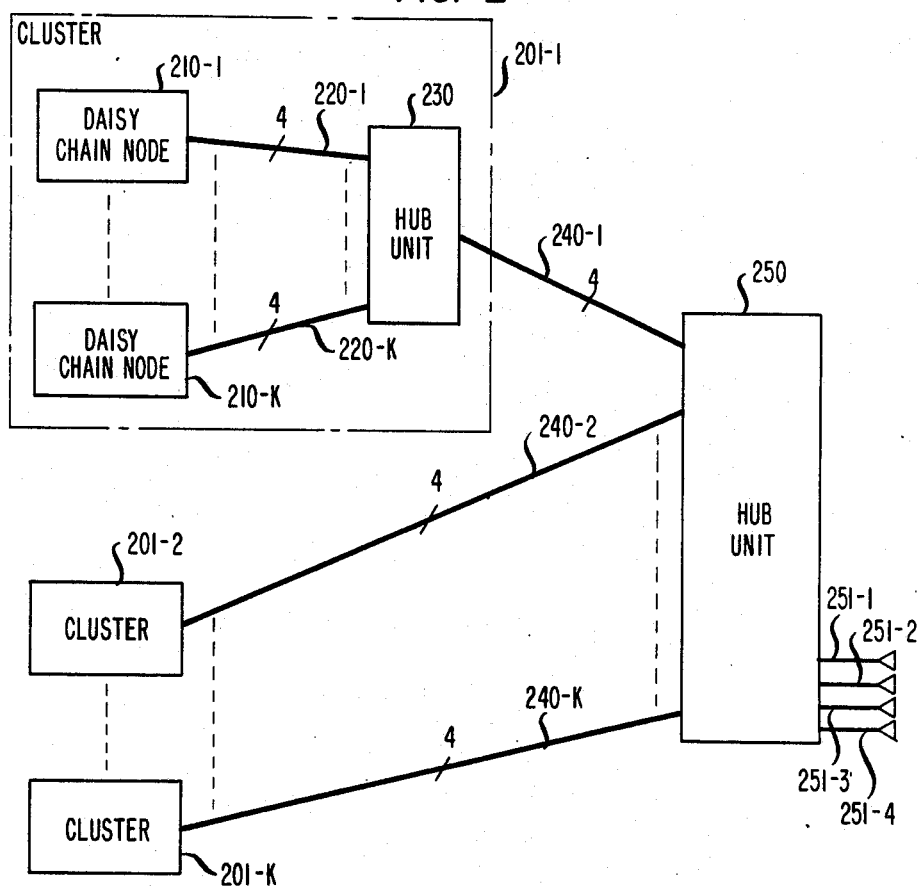
FIG. 2 is a simplified block diagram of a daisy/star configuration for a local area network.
Figure 3:
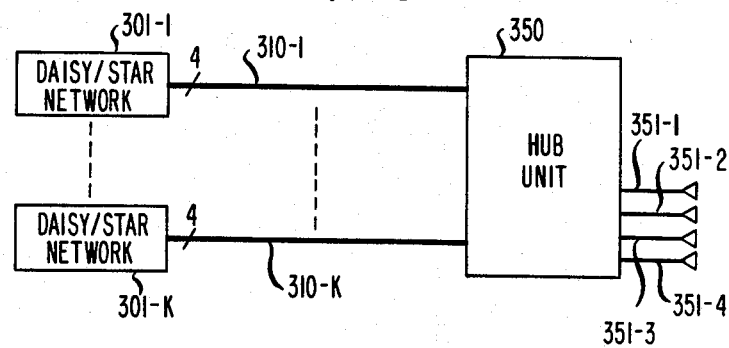
FIG. 3 is a simplified block diagram of an extended daisy/star configuration for a local area network.

Various possible configurations for local area networks designed in accordance with the principles of this invention are shown in FIGS. 1 through 3. Detailed diagrams of local area network elements shown simply as blocks in FIGS. 1 through 3 are given in FIGS. 4 through 6.

Network elements (hub units and access units) bearing the same name but different reference numerals are understood to be substantially identical unless expressly stated to the contrary. It is understood by those skilled in the art that the configurations and diagrams shown in the Figures are merely for purposes of illustration rather than limitation.

Overview of Feature for Present Local Area Network

Figure 4:
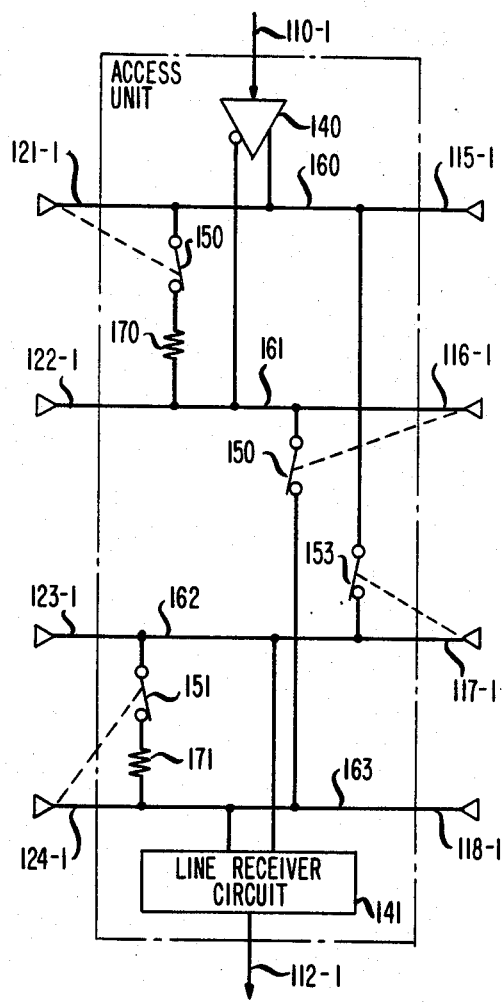
FIG. 4 shows, in simplified schematic form, a circuit diagram for a network access unit in accordance with the principles of the invention.
Figure 5:
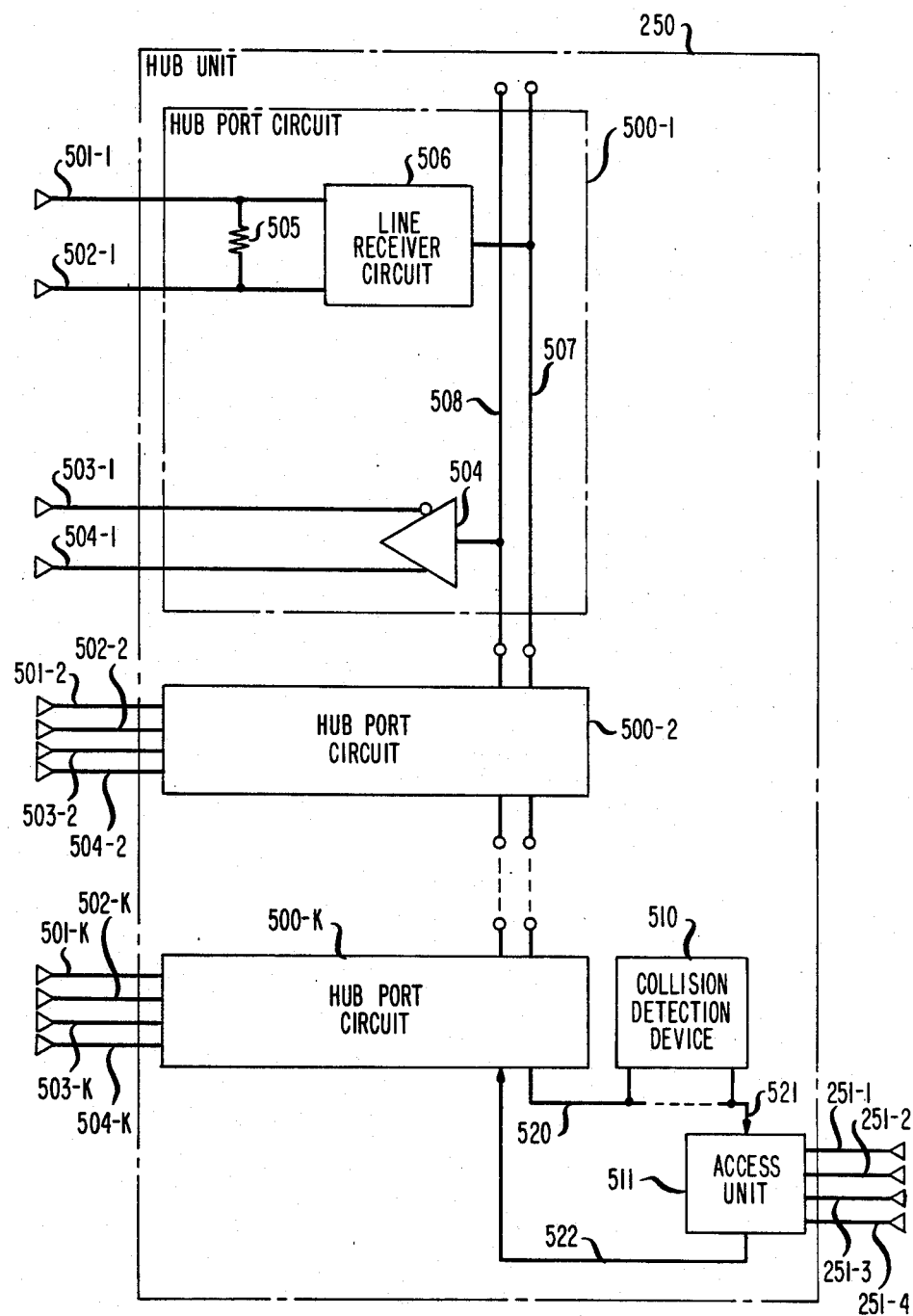
FIG. 5 shows, in simplified schematic form, a circuit diagram for a hub unit.
Figure 6:
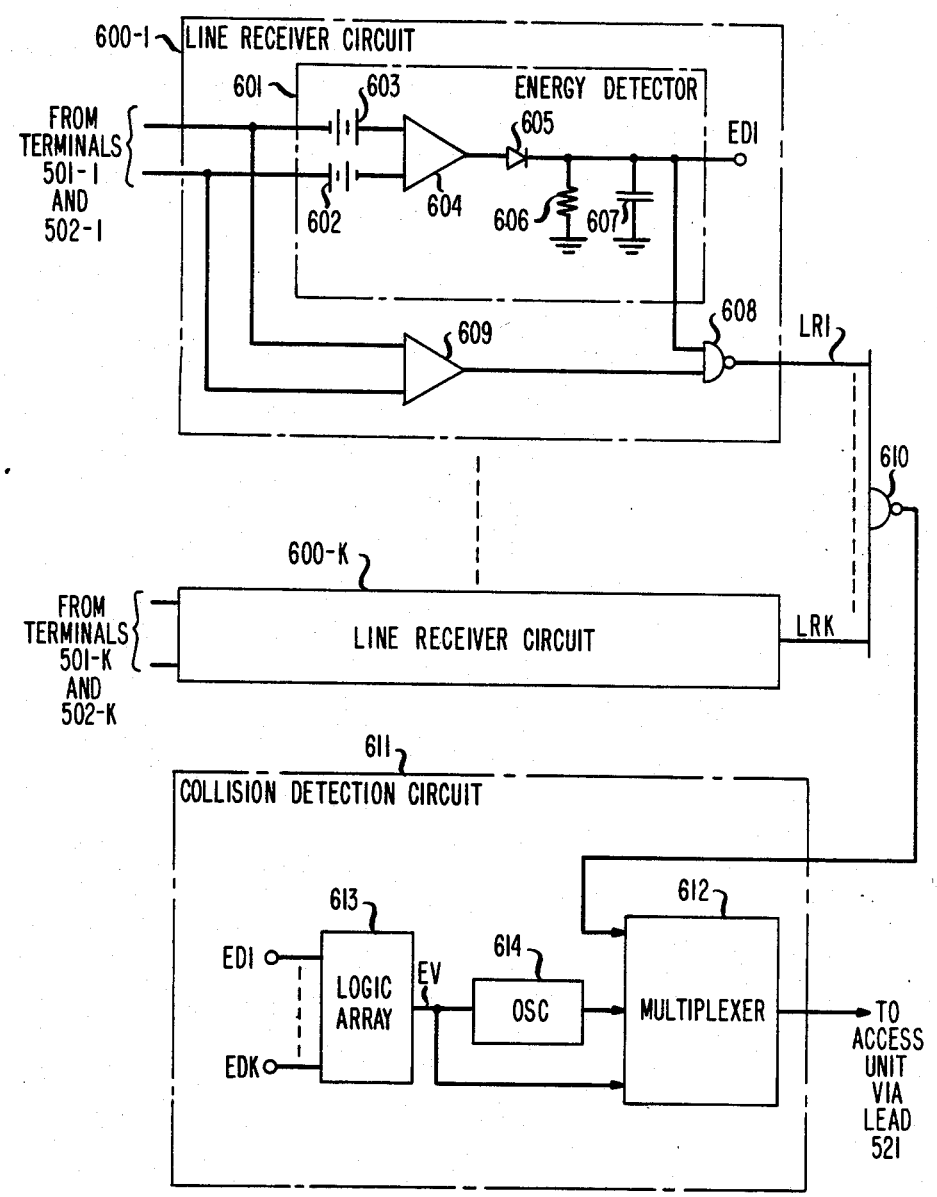
FIG. 6 shows, in schematic form, a receiver circuit, a logical OR function bus and a collision detection circuit integrated as in the receiver portion of a hub unit.

The following network features are present for the local area network configurations shown in FIGS. 1-3 when deployed using the network elements shown in FIGS. 4-6. Existing building wiring, both from service closet to service closet and from service closet to each office in the local area network, is used to interconnect network elements. Rewiring using coaxial cable or the like is unnecessary.

Use of existing wiring also provides other benefits such as ease of configurability of the network and ease of interconnection to the network. Since a transmission medium already exists from an office to the service closet, one need only connect a network access unit to the office end of the transmission medium and a hub unit to the service closet end of the same medium in order to configure the network office-by-office. Interconnection is simplified because most modern wiring schemes make use of modular connector jacks and sockets to terminate the transmission medium.

Repeaters and/or regenerators are not needed in the present network to boost the transmitted signal power and resynchronize the transmitted signal in order to complete a round trip through the network. Unrepeatered transmission is achieved, in one exemplary network, by standard line drivers and receivers for differentially balanced signal transmission on dual twisted pair wire. The present local area network can be extended over a large geographical area by the use of repeaters and regenerators.

Separate transmission paths are used for broadcasting signals to the network and for receiving signals therefrom.

The present network access unit connected to each device (end-user) in the local area network permits simple daisy chaining from one device to the next. While close proximity is preferred between adjacent daisy chained devices, it is not required. Also, within each daisy chain, interconnection of network access units automatically causes both impedance termination of the transmission medium to be connected at only one end ("far end") of the medium and short circuit or loopback from one transmission path to the other to be connected at the opposite end ("head end").

Network management and control are accomplished without the use of sophisticated electronic switches or private branch exchanges centralized in the network. Rather, the collision detection or avoidance mechanisms disposed throughout the network provide a suitable degree of management and control.

The present hub unit, which interconnects a group of network access units together, includes bus structures for each separate transmission path. These bus structures are the only busses in the local area network. Each bus is extremely short, for example, either the backplane for a printed circuit card rack or the input to an integrated circuit such as a multiple input NAND or OR gate. As such, these busses are more accurately called virtual busses. Because the busses are virtual (physically short), group delay and other signal distortion processes do not affect the integrity of the signals on the busses. Therefore, there is no need for retiming/delaying various signals on the busses.

Also, the present hub unit includes a collision detection arrangement, if necessary, connected to the bus structures between the separate transmission paths. Detection is performed by relying on and examining known characteristics of digital signals on the bus rather than composite, corrupted analog signals.

Loop-back is also provided by the hub unit in a similar manner to that provided by the network access unit. The loop-back connection is disabled (and passed to the next higher hub in a hierarchical sense) when one hub is connected to another hub.

In the present local area network, in accordance with this invention, termination impedances are located at each endpoint whereas only one loop-back point is located at the highest point, hierarchically, in the local area network.

These and other features of the present invention will become apparent to those persons skilled in the art upon reading the following description.

DESCRIPTION OF LOCAL AREA NETWORK CONFIGURATIONS

FIG. 1 shows a basic building block of the local area network, that is, a daisy chain node. Daisy chain node 100 includes N devices connected together in daisy chain fashion via N access units individually associated with each device as shown. Each access unit provides input and output connection for its associated device to and from the transmission paths as well as providing input and output ports to allow easy extension of or connection to the daisy chain in either direction. Daisy chaining refers to the fact that each device, through its access unit, is effectively connected in parallel across the transmission medium which, in FIG. 1, is shown as dual balanced twisted pair wire. Each device includes a circuit arrangement (not shown in the Figures) which is capable of monitoring data received by the device to determine whether a collision has been detected between two or more signals on the transmission medium.

Specifically, device 101-1 has its output connected via lead 110-1 directly to access unit 120-1; the output of access unit 120-1 is connected via lead 112-1 to device 101-1. As shown in FIG. 1, each of the remaining N−1 devices is connected with its associated access unit in a similar manner to that described above.

Interconnection from one device to the next is facilitated by dual twisted pairs of wires (four wires) connected between the output/input port of one access unit and the input/output port of the next adjacent access unit. As shown in FIG. 1, dual twisted pair 130-1 is connected between the output/input port of access unit 120-1 and the input/output ports of access unit 120-2. Similar connections are made via dual twisted pairs (dual twisted pair 130-2 through dual twisted pair 130-(N−1)) to the remaining access units (through access unit 120-N) in daisy chain node 100.

In order to provide a good transmission path in daisy chain node 100, each transmission line in the dual twisted pair must be terminated by an impedance equivalent to the characteristic impedance of the line. The characteristic impedance terminations are generally located at the "far end" of the transmission path, for example, at the input/output port of access unit 120-1 connected to terminal 121-1 through terminal 124-1. Effective communication is provided by a simple "loop-back" or short from one twisted pair to the other. This normally occurs at the "head end" of the transmission path, for example, at the output/input port of access unit 120-N connected to terminal 125-N through terminal 128-N. As an alternative to externally terminating and looping back the input/output and output/input controllable ports of the respective access units, switchable termination impedances and short circuits may be provided as an internal circuit feature of each access unit wherein connection of a dual twisted pair to an input/output or output/input port automatically disconnects the termination impedance and short circuit loop-back connections, respectively, within that access unit. This feature will be discussed in more detail below with respect to FIG. 4.

Throughout the description above, it has been assumed that N devices comprise a daisy chain node. Clearly, N is an integer which is greater than or equal to 1.

FIG. 2 shows a local area network configuration referred to as a daisy/star configuration. "Daisy" refers to the fact that there is a plurality of daisy chain nodes; "star" refers to the fact that the configuration of daisy chain nodes and hubs grouped into clusters resembles a star having hub unit 250 as its center and cluster 201-1 through cluster 201-K as its endpoints.

The K daisy chain nodes in cluster 201-1 individually resemble daisy chain node 100 in FIG. 1. Within cluster 201-1, each daisy chain node is connected to hub unit 230 via a dual twisted pair attached to the output/input port of one access unit (typically the "far end" access unit) in the daisy chain node. This latter connection is illustrated by dual twisted pair 130-N in FIG. 1. Specifically, daisy chain node 210-1 is connected to hub unit 230 via dual twisted pair 220-1. The remaining K−1 daisy chain nodes in cluster 201-1 are connected to hub 230 by similar dual twisted pairs 220-2 through 220-K. For completeness, it should be noted that K is an integer greater than or equal to 1 and is related to the number of input/output ports available in a hub unit.

The hub unit provides several important features for the local area network. First, each hub unit permits interconnection via K hub input/output ports for K groupings of devices wherein a grouping is either a cluster or a daisy chain node. Second, each hub unit provides a logical bus structure for signals to be communicated among devices. Finally, each hub includes, when applicable, appropriate collision detection apparatus to avoid interference among devices trying to communicate simultaneously. It should be clear to those persons skilled in the art that collision detection apparatus is unnecessary when token passing or other collision-free protocols or other electronic or hardwire protocols are employed with the daisy/star configuration or any other configuration designed in accordance with the principles of this invention.

In addition to the features described above, each hub provides a single hub output/input port which serves either to connect one hub unit to another or to provide a loop-back point for the network similar to that of the daisy chain "head end." Hub-to-hub connection is shown from hub unit 230 to hub unit 250 via dual twisted pair 240-1. Similar connections occur between hub units in the remaining K−1 clusters and hub unit 250. Loop-back occurs internally or externally at the output/input port of hub 250, specifically at hub terminal 251-1 through hub terminal 251-4.

FIG. 3 shows a further extension of the daisy/star local area network configuration in which a plurality of daisy/star networks are connected to a single hub. In particular, daisy/star network 301-1 (as shown by FIG. 2) is connected from its hub output/input port (terminals 251-1 through 251-4) to the hub input/output port of hub unit 350 via dual twisted pair 310-1. Similar connection is made between the remaining K−1 daisy/star networks and input/output ports of hub unit 350. The output/input port of hub unit 350 at hub output terminal 351-1 through hub output terminal 351-4 serves as a loop-back point (as described hereinabove) for the extended daisy/star local area network.

The local area network architectures shown in FIGS. 1 through 3 are not meant to be all inclusive. The architectures are hierarchical in nature and can be expanded accordingly. For example, devices include microcomputers, display terminals, printers, PBXs, switching devices, information service networks, other local area networks and the like. The devices may be connected directly to each other as a daisy chain node or they may be individually connected to a hub unit anywhere in the local area network. Groups of devices or daisy chain nodes which terminate to a hub unit form a cluster. Groups of clusters combined at another hub unit form a daisy/star network. Plural daisy/star networks combine at a hub unit to form an extended daisy/star network, and so on. Clearly, many combinations, permutations and extensions are possible based upon the principles incorporated in these Figures. While each network architecture has been explored and described with a certain degree of symmetry, there is no reason militating against asymmetric construction of the local area network. Reduced to its most simple terms, this means that a hub unit located anywhere in the network may serve as a connection point for either daisy chain nodes or clusters or daisy/star networks or any combination of the above.

Dual twisted pairs have been described above as a preferred transmission medium. Several reasons for this preference are readily apparent and based upon efficiency, economic concerns and transmission characteristics. For example, intra-building and, particularly, inter-office telephone wiring is generally accomplished in advance of any local area network planning by using multiple twisted pair cables. Hence, the medium providing point-to-point network interconnection is already in place for existing buildings. Access to the cable pairs is usually simplified by the use of modular connector jacks and sockets. This wire is small in size and offers ease in installation, cutting, splicing and testing. From a safety standpoint, the twisted pair presents a substantially reduced shock hazard over shielded coaxial cable because all power and data signals are transformer coupled. Also, it is significantly easier to match the characteristic impedance of twisted pair wire than matching that of coaxial cable. Finally, the twisted pair, from a transmission line standpoint, offers a reasonable degree of noise immunity especially to other services such as voice circuits sharing the same cable binder group.

While dual twisted pair interconnections have been described above, it should be obvious to those persons of ordinary skill in the art that other transmission media can be substituted for the dual twisted pairs. For example, dual untwisted (ribbon type) pair wire may be substituted for the twisted pair transmission medium. Also, a single twisted/untwisted pair of wires can be employed wherein one wire serves as a transmission path away from a device and the other lead serves as a return path toward the same device. Because such a substitution results in an unbalanced transmission condition, access units and hub units must be correspondingly changed from differentially balanced logic element design to unbalanced logic element design. Examples of other suitable transmission media include dual optical fibers (single mode or multimode), dual coaxial cable, a single bidirectional, polarization-preserving, optical fiber. Incorporation of the latter transmission media in the local area network requires that corresponding changes be made, where necessary, to the access units and hub units.

DESCRIPTION OF LOCAL AREA NETWORK ELEMENTS

FIG. 4 shows a simplified circuit diagram for a local area network access unit. Access unit 120-1 includes an input/output port including terminals 121-1 through 124-1, an output/input port including terminals 115-1 through 118-1, line driver 140, line receiver circuit 141, switches 150 through 153, termination impedances 170 and 171, and transmission paths 160 through 163. As described above, the access unit is connected to its associated device through leads 110-1 and 112-1.

Switches 150 through 153 are normally closed. If any media connector such as a dual twisted pair is connected to the input/output port, switches 150 and 151 via the connection made to terminals 121-1 and 124-1, respectively, are electrically, mechanically, or otherwise opened thereby removing the termination impedances 170 and 171 from this circuit. Similarly, when connection of a dual twisted pair is made to the output-/input port via terminals 115-1 through 118-1, the short circuit or loop back is removed from this particular circuit because switches 152 and 153 are caused to be opened. Switches or other devices capable of performing in this manner in conjunction with a terminal connection are well known throughout the telephone and associated industries. Such devices distributed by AT&T are jacks from the 657J and 657S families and mating plug assemblies. It should be understood that, while the state of each switch is shown to be controlled by connection to particular terminals of the access unit (shown by the dashed lines in the Figure), the state of each switch is functionally related to whether there is a connection to the particular port.

Transmission paths 160 through 163 couple the input-/output port at terminals 121-1 through 124-1, respectively, directly with the output/input port at terminals 115-1 through 118-1, respectively, thereby maintaining the daisy chain structure.

When no connection is made to the input/output port of the access unit, termination impedance 170 terminates transmission path 160 and 161 and termination impedance 171 properly terminates paths 162 and 163. The termination impedances are selected to approximate and match the characteristic impedance of the transmission paths.

When operating in a dual twisted pair interconnection environment as depicted in the Figures, line driver 140 is a differentially balanced line driver. An input signal from the associated device on lead 110-1 is translated into a pair of balanced signals. Each balanced signal is then applied either directly or through impedance matching transformers or other similar impedance matching devices to its respective transmission path, either path 160 or 161. Assuming that no connection is made to the output/input port, then it is apparent that the balanced signal on path 160 is shunted directly through switch 153 to path 162. In a similar manner, the balanced signal on path 161 is shunted directly through switch 152 to path 163.

Line receiver circuit 141 receives the balanced signals from transmission paths 162 and 163 to reconstruct an unbalanced input signal to be supplied to the associated device via lead 112-1. Line receiver circuit 141 is realizable as a standard differentially balanced signal line receiver or as a simple zero crossing detector or as a more complex combination of an energy detector controlling a zero crossing detector as shown in FIG. 6.

FIG. 5 shows one embodiment for hub unit 250 in a more detailed schematic circuit form. The hub unit includes K input/output ports, a single output/input port, K hub port circuits, an optional collision detection circuit and an access unit. These elements cooperate to provide the generic hub unit functions described above.

Each input/output port is access via a set of four terminals. For example, the K-th port is accessed via terminals 501-K through 504-K. The output/input port, usually a loop-back or network extension point, is attached via terminals 251-1 through 251-4.

Hub port circuit 500-1 is comprised of both a receive portion including termination impedance 505, line receiver circuit 506 and transmission path 507 and a transmit portion including transmission path 508 and line driver 504. the remaining K−1 hub port circuits are substantially identical to hub port circuit 500-1. Termination impedance 505 connected between terminals 501-1 and 502-1 is then chosen to match the characteristic impedance of the transmission path. Line receiver circuit 506 provides balanced-to-unbalanced signal conversion identical to line receiver 141 (see FIG. 4). Transmission path 507, as shown in FIG. 5, is one embodiment of a logical OR bus when extended through all K hub port circuits.

The logical OR bus formed by the series connection of receive portion transmission paths 507 from each hub port circuit is connected by lead 520 to either collision detection device 510 or via the optional short circuit (dashed line) to lead 521 and access unit 511.

Collision detection device 510, when used, monitors the signals supplied via lead 520. If it appears that two signals have collided, that is, interfered with each other, then collision detection device 510 inhibits further transmission of the interfering signals and broadcasts onto lead 521 by a predetermined signal that a collision has occurred. Upon receipt of such a broadcast, each device in the network ceases transmission.

Access unit 511 is identical to the access unit shown in FIG. 4. The output/input port of access unit 511 acts as the output/input port for the hub unit. Signals supplied to access unit 511 on lead 521 are translated to differentially balanced signals on terminal 251-1 and terminal 251-2. Loop-back or other balanced signals arriving at terminals 251-3 and 251-4 are converted to unbalanced signals by the access unit 511 and supplied to the series connected hub port circuits on lead 522.

The transmission path 508 associated with the transmit portion of each hub port circuit is serially connected to the corresponding transmission paths 508 in adjacent hub port circuits. Signals on transmission path 508 are converted by line driver 504 into differentially balanced signals available at terminals 503-1 and 504-1.

FIG. 6 shows an alternative embodiment of the receive portion of a hub unit. This embodiment includes K line receiver circuits 600-1 through 600-K, a logical OR bus structure, and collision detection circuit 611.

Each line receiver circuit includes an energy detector and a zero crossing detector, both of which have their output signals gated together. In line receiver circuit 600-1, balanced input signals are received from terminals 501-1 and 502-1 of the corresponding hub input/output port. The balanced input signals are shared between the energy detector 601 and the zero crossing detector 609. In energy detector 601, the balanced signals are each offset by a predetermined dc voltage represented by dc sources 602 and 603. The offset balanced signals are then applied to a line receiver 604 to convert the offset balanced signals to an unbalanced signal. This unbalanced signal is supplied to a rectifier and low pass filter section comprised of diode 605, resistor 606 and capacitor 607. The diode, resistor and capacitor are chosen to cause a fast attack and slow decay energy detection process. The attack time is limited by the internal impedance of line receiver 604. This limited attack time prevents narrow noise transients from asserting energy detection. Thus, energy detection is asserted for signals which exceed the offset bias for a time period greater than the attack time of the diode, resistor and capacitor combination. In an example from experimental practice, the resistor and capacitor values are chosen to cause the attack time to be on the order of one-fourth period of a data bit and the decay time to be on the order of several (two or three) bit periods. The output of the low pass filter is a smooth unbalanced signal referred to as energy detector signal ED1. Signal ED1 is supplied to the input of NAND gate 608.

The line receiver circuit also includes zero crossing detector 609 which is realizable as a line receiver. The unbalanced signal output from zero crossing detector 609 is supplied to NAND gate 608. When the energy detector determines that a valid signal is present, NAND gate 608 is activated to transmit the output signal from zero crossing detector 609. When an invalid signal is present or in the absence of a signal as determined by the energy detector, NAND gate 608 is disabled. The line receiver circuits 600-1 through 600-K generate line receiver output signals LR1 through LRK, respectively.

Line receiver output signals LR1 through LRK are supplied to K-input NAND gate 610. Gate 610 operates as a logical OR bus structure (inverted logic) providing a single output to collision detection circuit 611. The path from the output of gate 610 to circuit 611 is equivalent to the lead 520 in FIG. 5. Logic gate 610 can be changed to be an OR gate provided accomodating logical inversions and other changes are made.

Collision detection circuit 611 includes multiplexer 612, logic array 613 and collision presence oscillator 614. The collision detection circuit determines if more than one incoming signal is present at the K input/output ports of the hub unit and, on the basis of that determination, it either allows the output of NAND gate 610 to be passed to the access unit or transmits a collision presence signal which notifies the entire local area network that a collision has occurred.

In operation, logic array 613 receives the energy detector output signals ED1 through EDK from all line receiver circuits in the hub unit. Logic array 613 is configured to output a logically high energy violation signal EV only when the K energy detector output signals indicate the presence of two or more energy detector signals being high. Otherwise, energy violation signal EV is in a low state. When signal EV is high, it causes the collision presence oscillator 614 to be activated and it causes multiplexer 612 to output the error signal supplied by the collision presence oscillator. Otherwise, when signal EV is low, the collision presence oscillator is inactive and multiplexer 612 outputs the signal supplied from NAND gate 610.

In an example from experimental practice, unbalanced signals in the network are Manchester encoded baseband signals transmitted at a rate of approximately 1.0 Mbps. As such, collision presence oscillator 614 generates a signal which produces a large number of Manchester code violations within a predetermined interval. For example, the signal from collision presence oscillator 614 could be as simple as a 0.667 MHz. signal which produces an optimum number of severe Manchester code violations within a given information bit period. In this case, there are extreme variations between zero crossings of the Manchester coded signal at 1 Mbps and the $\frac{2}{3}$ MHz signal.

What is claimed is:

1. A local area network arrangement for providing communications on first and second segmented transmission means among a plurality of devices, each device communicating through a network access means connected to the device and to the first and second segmented transmission means, each network access means including, transceiver means for translating signals from the device to the first segmented transmission means via first and second ports and for translating signals from the second segmented transmission means via first and second ports to the device, the first port including input terminal means for connecting the first segmented transmission means thereto, output terminal means for connecting the second segmented transmission means thereto, and means for terminating the first and second segmented transmission means each with a characteristic termination impedance, the terminating means being connected from the input terminal means of the first port to the output terminal means of the first port only in the absence of connection between the segmented transmission means and the first port, and the second port including input terminal means for connecting the second segmented transmission means thereto, output terminal means for connecting the first segmented transmission means thereto, and loop back means connected from the input terminal means to the output terminal means of the second port for providing a low impedance electrical path therebetween only in the absence of a connection between the segmented transmission means and the second port, the input and output terminal means of the first port being connected directly to the output and input terminal means, respectively, of the second port, the second port of each network access means adapted for connection via the segmented transmission means to the first port of an adjacent network access means.

2. The local area network arrangement as defined in claim 1 wherein the first segmented transmission means is a twisted pair of wires and the second segmented transmission means is a twisted pair of wires.

3. The local area network arrangement as defined in claim 1 wherein the local area network is further comprised of at least first hub means for expanding the local area network by providing interconnectivity between other such hub means and network access means via first and second segmented transmission means, the at least first hub means including, first and second common bus means, first through K-th ports, each port having both input terminal means for connecting the first segmented transmission means thereto and output terminal means for connecting the second segmented transmission means thereto, first through K-th port circuit means, each port circuit means being connected to the corresponding port for translating signals from the input terminal port to the first common bus means and for translating signals from the second common bus means to the output terminal means, an access means connected in circuit relationship to the first and second common bus means for translating signals from the first common bus means to the first segmented transmission means and for translating signals from the second segmented transmission means to the second common bus means, and a (K+1)th port including input terminal means for connecting the second segmented transmission means thereto, output terminal means for connecting the first segmented transmission means thereto, and loop back means connected from the input terminal means to the output terminal means of the (K+1)th port for providing a low impedance electrical path therebetween only in the absence of a connection between the segmented transmission means and the (K+1)th port.

4. The local area network arrangement as defined in claim 3 wherein the first segmented transmission means is a twisted pair of wires and the second segmented transmission means is a twisted pair of wires.

5. The local area network arrangement as defined in claim 3 wherein the at least first hub means further includes collision detection means connected to the first common bus means and the access means for determining the occurrence of a collision between two or more signals on the first common bus means and supplying a collision signal representing such collision occurrence to the access means and, in the absence of signal collision, for permitting transmission of the signal on the first common bus means to the access means.

6. The local area network arrangement as defined in claim 5 wherein the first segmented transmission means is a twisted pair of wires and the second segmented transmission means is a twisted pair of wires.

7. The local area network arrangement as defined in claim 5 wherein the collision detection means is connected in the circuit between the first common bus means and the access means.

8. The local area network arrangement as defined in claim 7 wherein the first segmented transmission means is a twisted pair of wires and the second segmented transmission means is a twisted pair of wires.

9. The local area network arrangement as defined in claim 8 wherein the collision detection means, upon detection of signal collision on the first common bus means, inhibits transmission of colliding signals to the access means.

10. The local area network arrangement as defined in claim 5 wherein the first common bus means is a K-input logic element capable of performing a logical OR function on the signals from first through K-th port circuit means.

11. The local area network arrangement as defined in claim 10 wherein the first segmented transmission means is a twisted pair of wires and the second segmented transmission means is a twisted pair of wires.

12. A network access arrangement for use in a local area network providing communications on first and second segmented transmission means among a plurality of devices, each device connected through a corresponding network access arrangement connected to the device and to the first and second transmission means, said network access arrangement including, transceiver means for translating signals from the device to the first segmented transmission means via first and second ports and for translating signals from the second segmented transmission means via first and second ports to the device, the first port including input terminal means for connecting the first segmented transmission means thereto, output terminal means for connecting the second segmented transmission means thereto, and means for terminating the first and second segmented transmission means each with a characteristic termination impedance, the terminating means being connected from the input terminal means of the first port to the output terminal means of the first port only in the absence of connection between the segmented transmission means and the first port, and the second port including input terminal means for connecting the second segmented transmission means thereto, output terminal means for connecting the first segmented transmission means thereto, and loop back means connected from the input terminal means to the output terminal means of the second port for providing a low impedance electrical path therebetween only in the absence of a connection between the segmented transmission means and the second port, the input and output terminal means of the first port being connected directly to the output and input terminal means, respectively, of the second port, the second port of each network access arrangement adapted for connection via the segmented transmission means to the first port of an adjacent network access arrangement.

13. The network access arrangement as defined in claim 12 wherein the first segmented transmission means is comprised of a twisted pair of wires and the second segmented transmission means is comprised of a twisted pair of wires.

14. A hub arrangement for use in a local area network providing communications on first and second segmented transmission means among a plurality of devices, each device connected through a corresponding network access arrangement connected to the device and to the first and second transmission means, the local area network further comprised of at least one of said hub means, said hub means providing an expansion capability to the local area network by providing interconnectivity between other such hub means and network access means via first and second segmented transmission means, said hub means including, first and second common bus means, first through K-th ports, each port having both input terminal means for connecting the first segmented transmission means thereto and output terminal means for connecting the second segmented transmission means thereto, first through K-th port circuit means, each port circuit means being connected to the corresponding port for translating signals from the input terminal means to the first common bus means and for translating signals from the second common bus means to the output terminal means, an access means connected in circuit relationship to the first and second common bus means for translating signals from the first common bus means to the first segmented transmission means and for translating signals from the second segmented transmission means to the second common bus means, and a (K+1)th port including input terminal means for connecting the second segmented transmission means thereto, output terminal means for connecting the first segmented transmission means thereto, and loop back means connected from the input terminal means to the output terminal means of the (K+1)th port for providing a low impedance electrical path therebetween only in the absence of a connection between the segmented transmission means and the (K+1)th port.

15. The hub arrangement as defined in claim 14 wherein the first segmented transmission means is comprised of a twisted pair of wires and the second segmented transmission means is comprised of a twisted pair of wires.

16. The hub arrangement as defined in claim 14 wherein the at least first hub means further includes collision detection means connected to the first common bus means and the access means for determining the occurrence of a collision between two or more signals on the first common bus means and supplying a collision signal representing such collision occurrence to the access means and, in the absence of signal collision, for permitting transmission of the signal on the first common bus means to the access means.

17. The hub arrangement as defined in claim 16 wherein the first segmented transmission means is comprised of a twisted pair of wires and the second segmented transmission means is comprised of a twisted pair of wires.

18. The hub arrangement as defined in claim 16 wherein the collision detection means is connected in the circuit between the first common bus means and the access means.

19. The hub arrangement as defined in claim 18 wherein the first segmented transmission means iscomprised of a twisted pair of wires and the second segmented transmission means is comprised of a twisted pair of wires.

20. The hub arrangement as defined in claim 19 wherein the collision detection means, upon detection of signal collision on the first common bus means, inhibits transmission of colliding signals to the access means.

21. The hub arrangement as defined in claim 16 wherein the first common bus means is comprised of a K-input logic element capable of performing a logical OR function on the signals from first through K-th port circuit means.

22. The hub arrangement as defined in claim 21 wherein the first segmented transmission means is comprised of a twisted pair of wires and the second segmented transmission means is comprised of a twisted pair of wires.

* * * * *

UNITED STATES PATENT AND TRADEMARK OFFICE
CERTIFICATE OF CORRECTION

PATENT NO. : 4,674,085

DATED : June 16, 1987

INVENTOR(S) : William L. Aranguren, Mario A. Restrepo and Michael J. Sidey

It is certified that error appears in the above-identified patent and that said Letters Patent is hereby corrected as shown below:

In the Heading:

(21) Application No. "815,959" should read --915,959

Signed and Sealed this

Fifth Day of January, 1988

Attest:

DONALD J. QUIGG

Attesting Officer

Commissioner of Patents and Trademarks